No. 879,186. PATENTED FEB. 18, 1908.
C. A. MARIEN.
CUSHION TIRE WHEEL.
APPLICATION FILED FEB. 21, 1907.

WITNESSES:
L. L. Mead.
W. A. Alexander.

INVENTOR
C. A. Marien.
BY
Fowler & Bryson.
ATTORNEYS

UNITED STATES PATENT OFFICE.

CHARLES A. MARIEN, OF ST. LOUIS, MISSOURI.

CUSHION-TIRE WHEEL.

No. 879,186.　　　　Specification of Letters Patent.　　　　Patented Feb. 18, 1908.

Application filed February 21, 1907. Serial No. 358,535.

*To all whom it may concern:*

Be it known that I, CHARLES A. MARIEN, a citizen of the United States, residing at the city of St. Louis, in the State of Missouri, have invented a certain new and useful Cushion-Tire Wheel, of which the following is such a full, clear, and exact description as will enable any one skilled in the art to which it appertains to make and use the same, reference being had to the accompanying drawings, forming part of this specification.

My invention relates to cushion tire wheels and more particularly to that form of such wheel shown and described in my prior application #332125 of August 27, 1906.

The object of my present invention is to so construct a tire of the class above referred to that the cross bar will be free to move inwardly without bending when the weight of the vehicle is supported by the adjacent part of the tire. In order to accomplish this, I cushion the stock cross rods throughout their entire length with the resilient material of the tire so that the annular members which engage with the said cross bars do so only at the outer side of the bars.

Another object of my invention is to provide additional means for holding the tire in place by having the annular members above referred to engage not only the cross bars but also a portion of the tire itself.

Figure 1:
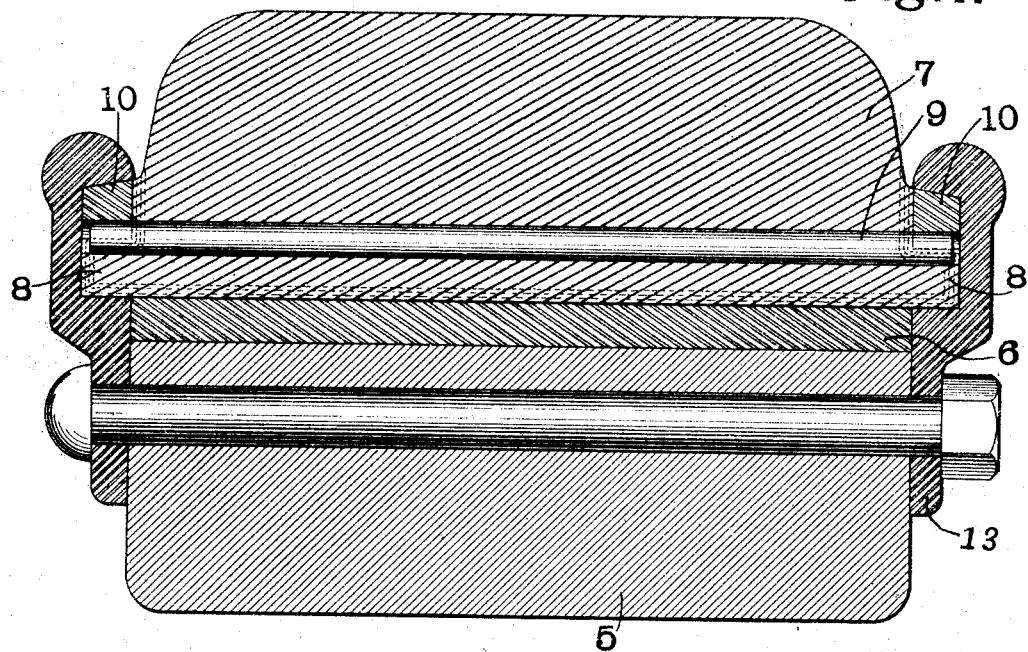
Figure 2:
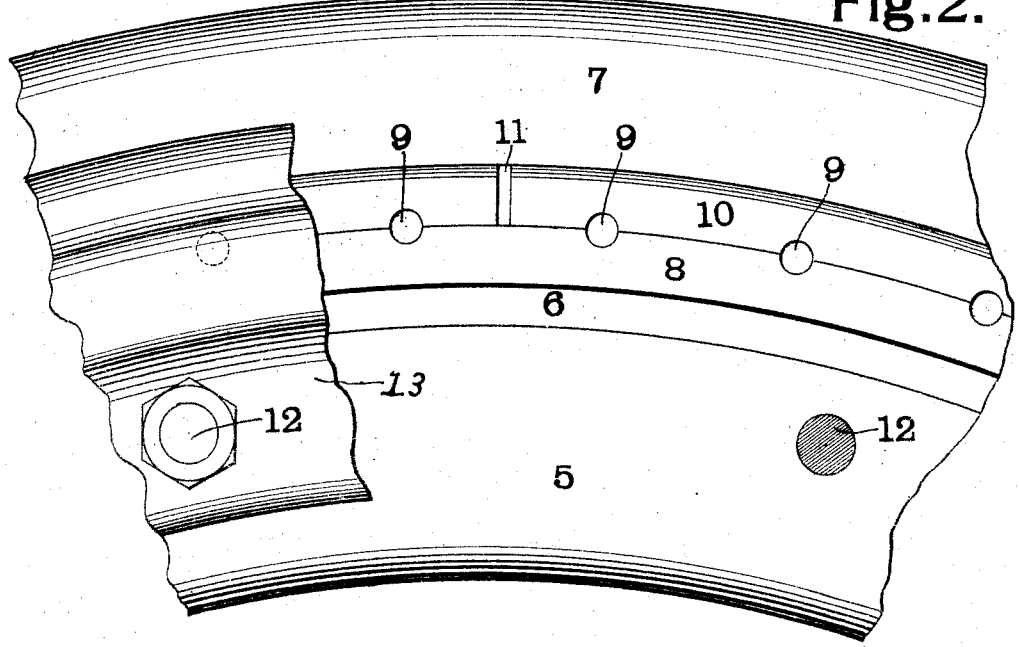

In the accompanying drawings, which illustrate one form of wheel made in accordance with my invention, Figure 1 is a cross section and Fig. 2 a side view of a portion of the wheel, the retaining plate being partially broken away.

Like marks of reference refer to similar parts in both views of the drawings.

5 represents the ordinary wooden felly and 6 the ordinary metal reinforcing band. These two members together constitute the rim of the wheel. Seated on the band 6 is the tire 7 of rubber or other resilient material. The tire 7 is so arranged and proportioned as best shown in Fig. 1 that projecting members 8 extend beyond the rim of the wheel.

9 are cross bars extending through the tire 7. These bars 9 are preferably arranged so that their end portions are embedded about half way in the projecting portion 8 of the tire. This is best shown in Fig. 2 of the drawings. Surrounding the projecting portions 8 and engaging with the exposed ends of the cross bars 9 are annular metallic rings 10. These rings 10 are split at 11 as shown in Fig. 2, so as to allow for a slight amount of expansion and contraction in the size of the rings and the periphery of each of said rings is beveled. This bevel coöperates with a corresponding bevel on the outer wall of the groove formed in the retaining plate 13 and adapted to receive one of the rings 10 and one of the projections 8 of the tire. The retaining plates 13 are held in position by means of bolts 12 passing through the two retaining plates and the felly 5 of the rim. As the rings 10 engage only with the outer side of the ends of the cross bars 9 and the said bars are cushioned throughout their length with the resilient material of the tire, when the adjacent portion of the tire is compressed, the cross bar can move a slight distance away from the rings 10 without being bent or otherwise injured. This I find greatly adds to the life of the device, at the same time the projecting portions 8 of the tire aid in holding the tire in position.

Having fully described my invention, what I claim as new and desire to secure by Letters Patent of the United States is:

1. In a vehicle wheel, the combination with a rim, of a tire of resilient material seated thereon, crossbars passing through said tire, retaining members of rigid material engaging the ends of said rods but allowing inward radial movement thereof when the tire is compressed, and retaining plates engaging the outer edges of said members whereby the outward radial movement of said rods is limited.

2. In a vehicle wheel, the combination with a rim, of a tire of resilient material seated thereon, cross bars passing through said tire, annular members of rigid material engaging the ends of said rods and limiting their outward radial movement but allowing inward radial movement when the tire is compressed, and retaining plates engaging the peripheries of said annular members.

3. In a vehicle wheel, the combination with a rim, of a tire of resilient material seated thereon, cross bars passing through said tire, annular members of rigid material engaging the ends of said rods and surrounding a portion of the tire, said members limiting the outward radial movement of said bars but allowing inward radial movement when the tire is compressed and retaining plates engaging the peripheries of said annular members.

4. In a vehicle wheel, the combination with a rim, of a tire of resilient material seated thereon, cross bars passing through said tire, portions of said tire extending beyond the body of the tire and forming seats for the ends of said cross bars, annular members engaging the ends of said bars and surrounding the projecting portions of said tire and retaining plates engaging the peripheries of said annular members.

5. In a vehicle wheel, the combination with a rim, of a tire of resilient material seated on said rim and provided with portions projecting laterally beyond said rim, cross bars passing through said tire with their ends resting on said projections, annular members of rigid material engaging the ends of said bars and retaining plates provided with grooves to receive said annular members and the projecting portions of said tire.

In testimony whereof I have hereunto set my hand and affixed my seal in the presence of the two subscribing witnesses.

CHARLES A. MARIEN.

Witnesses:
  W. A. ALEXANDER,
  ELIZABETH BAILEY.